United States Patent
Fong et al.

[11] Patent Number: 6,107,364
[45] Date of Patent: *Aug. 22, 2000

[54] METHYL STYRENE AS A HIGH INDEX OF REFRACTION MONOMER

[75] Inventors: Bettie C. Fong, Woodbury; David B. Olson, May Township, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/853,982

[22] Filed: May 9, 1997

[51] Int. Cl.⁷ .................................................. C08F 2/46
[52] U.S. Cl. .................... 522/182; 522/187; 522/188; 522/102; 351/159; 359/385; 526/292.3; 526/296; 428/176
[58] Field of Search ................................ 522/188, 187, 522/182, 102; 351/159; 359/385; 526/292.3, 296; 428/176

[56] References Cited

U.S. PATENT DOCUMENTS

| | | | |
|---|---|---|---|
| 3,845,102 | 10/1974 | Higuchi et al. | 260/479 R |
| 4,542,449 | 9/1985 | Whitehead | 362/330 |
| 4,578,445 | 3/1986 | Sakagami et al. | 526/292.3 |
| 4,721,377 | 1/1988 | Fukuda et al. | 351/159 |
| 4,803,140 | 2/1989 | Hiro | 430/58 |
| 4,812,032 | 3/1989 | Fukuda et al. | 351/159 |
| 4,970,135 | 11/1990 | Kushi et al. | 430/280 |
| 5,175,030 | 12/1992 | Lu et al. | 428/30 |
| 5,183,597 | 2/1993 | Lu | 264/1.4 |
| 5,183,870 | 2/1993 | Fukushima et al. | 526/273 |
| 5,331,073 | 7/1994 | Weinschenk, III et al. | 526/265 |
| 5,359,021 | 10/1994 | Weinschenk, III et al. | 526/264 |
| 5,394,255 | 2/1995 | Yokota et al. | 359/49 |
| 5,424,339 | 6/1995 | Zanka et al. | 522/168 |
| 5,486,949 | 1/1996 | Schrenk et al. | 359/498 |
| 5,552,907 | 9/1996 | Yokota et al. | 359/49 |
| 5,591,527 | 1/1997 | Lu | 428/411.1 |
| 5,592,332 | 1/1997 | Nishio et al. | 359/619 |
| 5,598,280 | 1/1997 | Nishio et al. | 349/57 |

FOREIGN PATENT DOCUMENTS

| | | | |
|---|---|---|---|
| 0 267 459 | 5/1988 | European Pat. Off. | C08F 2/02 |
| 0 267 460 | 5/1988 | European Pat. Off. | C08F 220/22 |
| 40 10 783 | 10/1991 | Germany | C08F 220/30 |
| 40 10 783 A1 | 10/1991 | Germany | C08F 220/30 |
| 61-286347 | 12/1986 | Japan | C07C 69/353 |
| 62-30174 | 3/1987 | Japan | C09J 3/14 |
| 1-50689 | 10/1989 | Japan | C07C 69/54 |
| 3-23404 | 1/1991 | Japan | G02B 5/30 |
| 03-153715 | 7/1991 | Japan | C08F 220/14 |
| 04-285654 | 10/1992 | Japan | C08L 33/12 |
| 6-123856 | 5/1994 | Japan | G02C 7/00 |
| 6-86408 | 11/1994 | Japan | C07C 69/54 |
| 2 089 523 | 6/1982 | United Kingdom . | |

OTHER PUBLICATIONS

** English Language Abstract.

*Primary Examiner*—Duc Truong
*Attorney, Agent, or Firm*—John A. Burtis

[57] ABSTRACT

Described are a polymerizable composition comprising methyl styrene monomer, polymers comprising monomeric units derived from methyl styrene monomers, and optical products comprising these polymers.

33 Claims, 1 Drawing Sheet

METHYL STYRENE AS A HIGH INDEX OF REFRACTION MONOMER

FIELD OF THE INVENTION

The invention relates to the use of methyl styrene monomer as a high index of refraction monomer.

BACKGROUND

Optical materials and optical products are useful to control the flow and intensity of light. Examples of useful optical products include optical lenses such as Fresnel lenses, optical light fibers, light tubes, optical films including totally internal reflecting films, retroreflective sheeting, and microreplicated products such as brightness enhancement films and security products. Examples of some of these products are described in U.S. Pat. Nos. 4,542,449, 5,175,030, 5,591,527, 5,394,255, among others.

Optical products can be prepared from high index of refraction materials, including monomers such as high index of refraction (meth)acrylate monomers, halogenated monomers, etc., and other such high index of refraction monomers that are known in the optical product art. See, e.g., U.S. Pat. Nos. 4,568,445, 4,721,377, 4,812,032, and 5,424,339. The monomers can be cured or polymerized to take the form of a product capable of modifying or controlling the flow of light. In the particular structure of a microreplicated optical product, the monomers can be polymerized into a brightness enhancement film having a microfine prismatic pattern. See U.S. Pat. Nos. 5,175,030 and 5,183,597. Brightness enhancement films (BEFs) are very useful in many of today's electronic products to increase the brightness of a backlit flat panel display such as a liquid crystal display (LCD) including those used in electroluminescent panels, laptop computer displays, word processors, desktop monitors, televisions, videocameras, and automotive and avionic displays.

Monomers used to prepare high index of refraction materials desirably exhibit very specific optical and physical properties. One important property of such monomers is a high index of refraction, because this property allows the monomer, or polymers thereof, to effectively control the flow of light. Additionally, such monomers preferably are soluble in other monomers, or can readily dissolve other monomers; that is, particularly preferred high index of refraction monomers can act as solvents to dissolve other monomers, allowing the mixture of monomers to exist in a liquid composition. Finally, preferred monomers or high index of refraction polymerizable compositions and polymers exhibit the ability to adhere to materials used as other components (e.g., substrates) within an optical product. There exists a continuing need for high index of refraction monomers that can act as a solvent, and that adhere well to other materials.

With respect specifically to brightness enhancement films, the index of refraction of components of a BEF is related to the brightness gain or "gain" produced by the brightness enhancement film. Gain is a measure of the improvement in brightness of a display due to the brightness enhancement film, and is related to the index of refraction of the material used to prepare the film, as well as the structure (i.e., geometry) of the brightness enhancing portion of the film. A high gain is desired for a brightness enhancement film because improved gain provides an effective increase in the brightness of a backlit display. Improved brightness means that the electronic product can operate more efficiently by using less power to light the display, thereby reducing power consumption, placing a lower heat load on components of the display, and extending the lifetime of the product. Thus, because of these advantages, there exists a continuing need to find optical products to provide improved levels of brightness gain, with even very small, seemingly incremental improvements being quite significant.

SUMMARY OF THE INVENTION

The present invention relates to the use of methyl styrene as a high index of refraction monomer to prepare polymerizable compositions, and high index of refraction materials, polymers, and optical products prepared therefrom. It has been found that methyl styrene monomer can effectively perform as a high index of refraction monomer, and that methyl styrene has the additional advantageous ability to act as a solvent to dissolve other materials, specifically high index of refraction materials (monomers, comonomers, oligomers, pre-polymers, polymers, etc.). It has been further found that methyl styrene monomer can increase the adhesion between a high index of refraction polymer derived therefrom, and a number of materials often used in the production of optical products.

Thus, an aspect of the present invention relates to a polymerizable composition comprising methyl styrene monomer and one or more comonomers comprising at least one high index of refraction comonomer.

A further aspect of the invention relates to a polymerizable composition comprising methyl styrene monomer, wherein the polymerizable composition has an index of refraction of at least 1.55, preferably at least 1.56.

A further aspect of the invention relates to an optical product comprising a polymeric material comprising monomeric units derived from methyl styrene monomer.

Yet a further aspect of the invention relates to a microstructure-bearing article comprising an optical layer derived from a polymerizable composition comprising methyl styrene monomer.

The invention also relates to backlit flat panel displays comprising such articles and computers comprising such displays.

As used within the present description:

"Monomer" refers to a monomer on an individual scale, and also refers collectively to a composition of such monomers on a macroscopic scale such that the composition can be described as having a physical state of matter (e.g., liquid, solid, etc.) and physical properties (e.g., melting point, viscosity, glass transition temperature, and/or refractive index).

"Melting point," as used with respect to the monomer, refers to the temperature at which the monomer passes from a solid to a liquid state, as measured at atmospheric pressure. Melting point can be measured, for example, using a Thomas-Hoover Melting Point Apparatus, available from the Thomas Scientific of Swedesboro N.J.

"Index of refraction," or "refractive index," refers to the absolute refractive index of a material (e.g., a monomer) which is understood to be the ratio of the speed of electromagnetic radiation in free space to the speed of the radiation in that material, with the radiation being sodium yellow light at a wavelength of about 589.3 nm. Index of refraction can be measured using an Abbe refractometer, available commercially, for example, from Fisher Instruments of Pittsburgh Pa.

"(Meth)acrylate" refers to both acrylate and methacrylate compounds.

"Curable composition" refers to a chemical composition that contains one or more polymerizable components as described in the present specification, including one or more of the identified monomers, oligomers, etc., and that can be cured or polymerized.

BRIEF DESCRIPTION OF THE DRAWING

FIG. 1 is not to scale and is intended to be merely illustrative and non-limiting.

DETAILED DESCRIPTION

Figure 1:
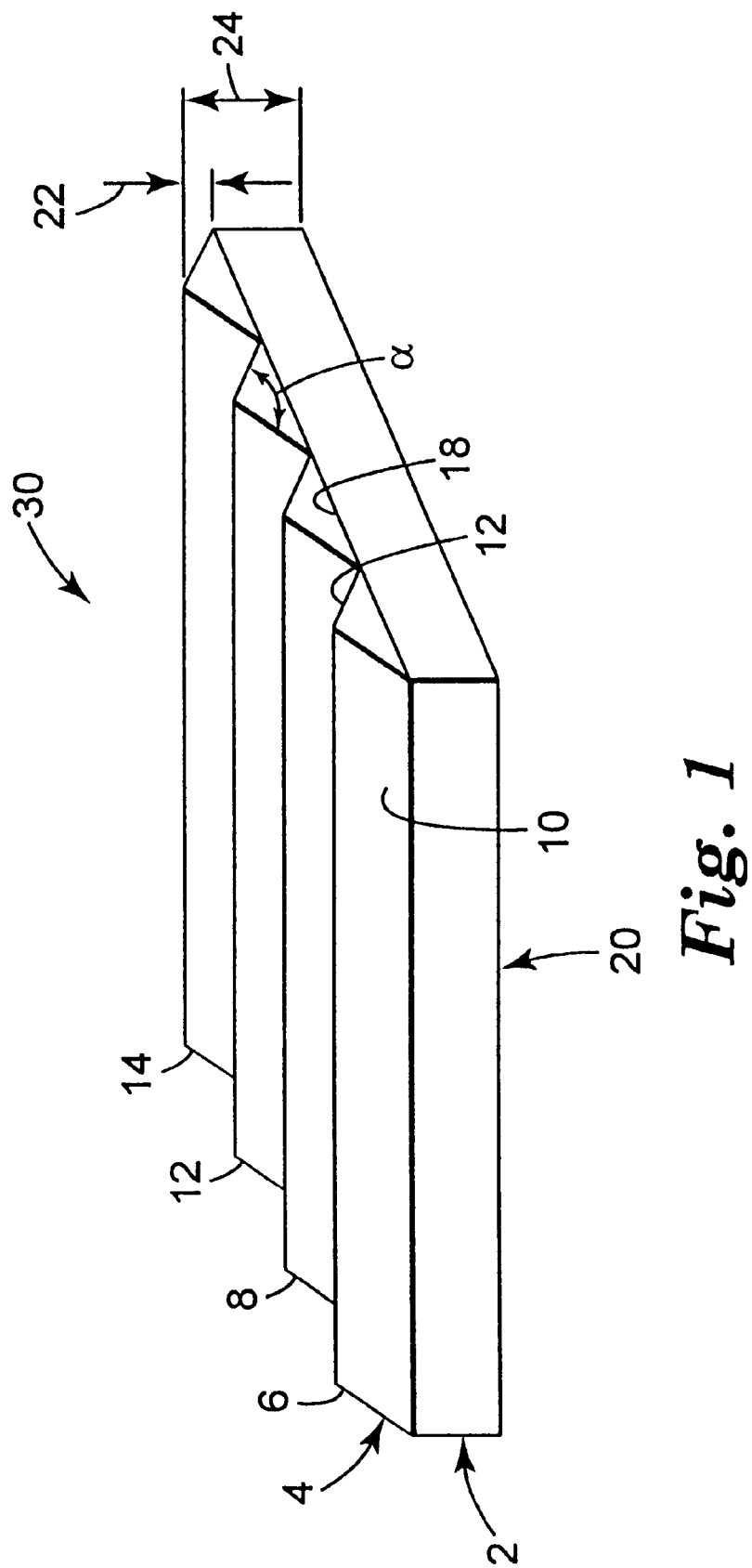
FIG. 1 is a perspective view of an illustrative microstructure-bearing optical product of the present invention.

The invention provides a polymerizable composition comprising methyl styrene monomer having the general formula:

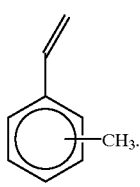

(1)

Methyl styrene exists and is useful in the polymerizable composition as any of various isomeric forms, including the ortho-, meta- and para- isomers. Methyl styrene monomer is commercially available as a mixture of one or more of these isomers. For example, methyl styrene monomer is commercially available in ratios of 80:20, 70:30, 60:40, 55:45, and 5:95 (meta:para):

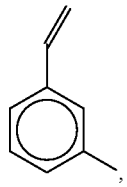

(2)

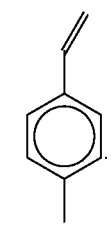

(3)

Methyl styrene is commercially available from Monomer-Polymer & Dajac Laboratory in Feasterville, Pa. Alternatively, methyl styrene can be prepared by methods known in the chemical art; see the Encyclopedia of Polymer Science and Engineering, volume 16, p. 13, (2nd ed. 1985).

As stated above, it has been found that methyl styrene monomers can effectively act as a solvent to dissolve other monomers such as high index of refraction materials (comonomers, oligomers, pre-polymers, polymers, etc.). Thus, methyl styrene can be used in combination with one or more other comonomers to produce a high index of refraction polymerizable composition (e.g., a polymerizable composition having an index of refraction of at least 1.55, preferably 1.56 or above). As used within the present description the term "polymerizable" refers to a chemical molecule such as a monomer or oligomer, etc., or, to a chemical composition, the molecule or composition being capable of curing, i.e., polymerizing or copolymerizing, for example, via unsaturated moieties, to produce a higher molecular weight material such as a polymer, prepolymer, or polymeric material. The terms "polymer," "polymerized material," and "polymeric material" are used interchangeably to refer to materials prepared from the reaction (i.e., polymerization or cure) of one or more unsaturated materials, e.g., one or more monomer, oligomer, polymer, or prepolymer, etc., and refers to, e.g., dimers, trimers, oligomers, prepolymers, copolymers, homopolymers, etc.

Comonomers included with methyl styrene in a polymerizable composition can be chosen from a number of comonomers known in the optical material art. The comonomer can comprise any of a number of known and useful polymerizable unsaturated moieties, e.g., vinyl, (meth)acrylate, N-vinyl, acrylic acid, methacrylic acid, allyl, acrylamide, acrylonitrile, etc. The comonomer can be mono- or multifunctional with respect to the unsaturated moiety, and where multifunctional, the unsaturated moieties need not be of identical chemistry.

One class of comonomer found to be useful in the polymerizable composition is the class of (meth)acrylate-functional monomers. Such (meth)acrylate functional comonomers can have a structure within the general formula:

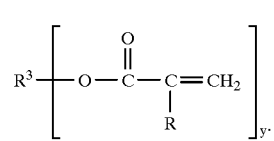

(4)

In formula 4, R can be hydrogen (—H) or methyl (—CH$_3$), y is preferably from about 1 to 6, and R$^3$ can be of any chemical structure that allows polymerization of the comonomer via the unsaturated moiety or moieties, and preferably provides a comonomer having an index of refraction of at least 1.50. Preferably, to achieve a sufficiently high index of refraction, R$^3$ can include one or more chemical moiety known in the optical product art to provide high optical activity, such as an aromatic, cyclohexyl, a halogen such as chlorine, bromine, or iodine, or a sulfur-containing group. Further, however, the R$^3$ group can comprise one or more other chemical moieties or structures, for example oxyalkylene, urethane, epoxy, alkyl, allyl, etc., any of which can be straight, branched, cyclic, or unsaturated.

Examples of specific useful (meth)acrylate-functional comonomers include a number of mono-, and multifunctional (meth)acrylate monomers, including hexafunctional aromatic urethane acrylate oligomer available from UCB Radcure Inc., under the designation EB 220; 2-phenoxyethyl acrylate sold under the trade name Photomer 4035 by Henkel Corp., of Ambler Pa.; cyclohexyl chloroacrylate; benzyl acrylate; ethoxylated bisphenol A di(meth)acrylate; and oligomers such as modified epoxy acrylate, available from Sartomer under the trade designations CN120M50 and CN131, among others. These (meth)acrylate-functional comonomers are not halogenated. However, particularly preferred polymerizable compositions of the present invention can comprise one or more halogenated comonomer(s), and most preferably can comprise one or more brominated aromatic (meth)acrylate comonomer(s).

Examples of such commercially available high index of refraction brominated monomers include brominated aromatic monomers such as 2-(2,4,6-tribromophenyl)-1-ethanol acrylic ester, sold as BR-31 (CAS #7347-19-5) by Dai-Ichi Kogyo Seiyaka Co. of Japan, and brominated epoxy diacrylate, manufactured by UCB Chemicals Corporation, Radcure, in Smyrna, Ga., under the designation RDX 51027. Still other brominated monomers that can be useful include tribromo phenyl acrylate, tetrabromobisphenol A diacrylate, ethoxylated tetrabromobisphenol A diacrylate, pentabromophenylacrylate, and tetrabromo xylyl diacrylate.

A specific class of comonomers useful in the polymerizable composition are alkyl-substituted brominated phenolic ester (meth)acrylate monomer, such as those described in Assignee's copending patent applications: "High Index of Refraction Monomers," having Attorney Docket Number 53247USA9A, "Chemical Composition and Polymers and Polymeric Material Derived Therefrom," having Attorney Docket Number 53386USA5A, and "Optical Product Prepared from High Index of Refraction Brominated Monomers," having Attorney Docket Number 53254USA4A, each being filed on even date herewith, and each disclosure being incorporated herein by reference. These alkyl-substituted brominated aromatic ester (meth) acrylate monomer (also referred to herein as "the Brominated Monomer," or "Brominated Monomer(s)") can preferably exhibit physical properties that allow a polymerizable composition containing such Brominated Monomer to be processed (e.g., blended, pumped, filtered, or otherwise handled prior to polymerization) at or near room temperature (e.g., in the range from about 20 to 25° C.) to produce a high index of refraction optical product. Thus, the Brominated Monomer can preferably have a relatively high index of refraction, e.g., 1.50 or more, preferably at least 1.55, and can preferably have a relatively low melting point (e.g., below about 60° C.). These Brominated Monomers can have the general formula:

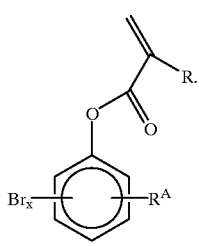

(5)

In formula 5, R can be hydrogen (—H) or methyl (—CH$_3$), R$^A$ can be a straight or branched alkyl, and x can be in the range from about 1 to 4, with the combination of these chosen variables preferably being chosen such that the Brominated Monomer has an index of refraction of at least 1.50. Most preferably R$^A$ can be a straight or branched alkyl having from about 1 to 18 carbon atoms, such as from about 3 to 12 carbon atoms. R$^A$ and each Br can be positioned either ortho, meta, or para to the ester.

A particularly preferred class of Brominated Monomer are those comprising an aromatic portion substituted with an alkyl at the position ortho to the ester substituent:

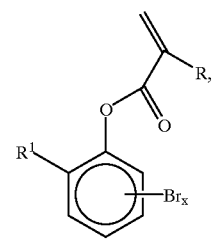

(6)

wherein R and x are defined above, and R$^1$ can be any alkyl sufficient to provide a brominated monomer having an index of refraction of at least 1.50. In a particularly preferred embodiment of this monomer, bromines are located at the 4 and 6 positions on the aromatic ring, ortho and para to the ester substituent:

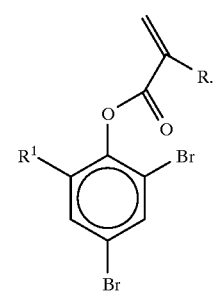

(7)

Particular monomers according to formula 7 include 4,6-dibromo-2-alkyl phenolic ester (meth)acrylates. Preferred of these are monomers wherein the alkyl (R$^1$) has from 3 to 4 carbons, such as the following:

4,6-dibromo-2-sec-butyl phenyl (meth)acrylate:

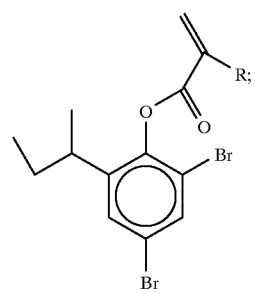

(7.1)

4,6-dibromo-2-tert-butyl phenyl (meth)acrylate:

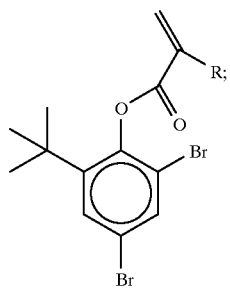
(7.2)

and, 4,6-dibromo-2-isopropyl phenyl (meth)acrylate:

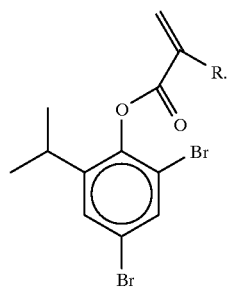
(7.3)

A second particularly preferred class of Brominated Monomer comprises an aromatic portion substituted with an alkyl group at the position para to the ester substituent:

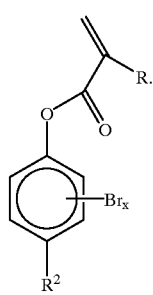
(8)

In FIG. 8, R and x are as defined with reference to FIG. 1, and $R^2$ is a straight or branched alkyl. Preferably, $R^2$ can be an alkyl group having from about 1 to 18 carbon atoms, more preferably from about 1 to 12 carbon atoms. Also preferably, the monomer can have at least two bromines attached directly to the aromatic ring. In a particularly preferred embodiment of this monomer, bromines are located at the 2 and 6 positions on the aromatic ring, each being ortho to the ester substituent:

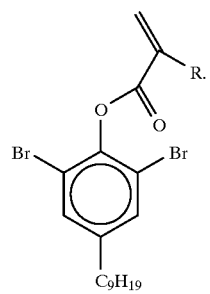
(9)

One particularly preferred para-substituted alkyl group is nonyl, giving dibrominated-4-nonyl phenyl (meth)acrylate monomers, such as 2,6-dibromo-4-nonyl phenyl (meth)acrylate:

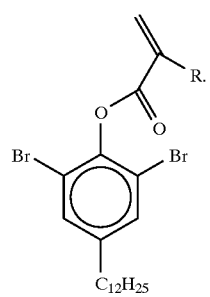
(10)

Another particularly preferred para-substituted alkyl group is dodecyl, giving dibrominated-4-dodecyl phenyl (meth)acrylate monomers, such as 2,6-dibromo-4-dodecyl phenyl (meth)acrylate:

(11)

The Brominated Monomers can be prepared by any method generally useful in preparing brominated phenolic compounds, and in particular alkyl-substituted brominated phenolic ester (meth)acrylates. Such methods are well known in the chemical art. By one particular method, an alkyl-substituted phenol is brominated to produce a brominated alkylphenol. Alkylphenols are commercially available, among other sources, from Schenectady International, Inc., Chemical Division, Schenectady, N.Y. Such alkyl-substituted phenols can be brominated by methods that are generally known in the chemical art, and are described, for example, in the Kirk-Othmer Encyclopedia of Chemical Technology, volume 4, 543 ($4^{th}$ ed. 1992). An example of such a process with respect to an ortho-substituted alkyl phenol is as follows:

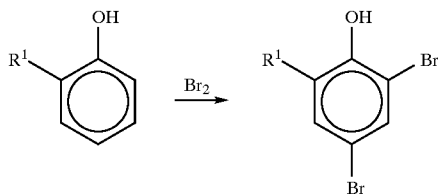

The brominated alkylphenol can be esterified to produce an alkyl-substituted brominated phenolic ester (meth) acrylate, by reaction with an appropriate acid chloride. The reaction between an alcohol and an acid chloride is well known in the chemical art, and is described, for example, in the Kirk-Othmer, Encyclopedia of Chemical Technology, volume 9, 769 ($4^{th}$ ed. 1992); see also U.S. Pat. No. 3,845,102. Inhibitors, such as phenothiazine or 4-methoxyphenol (MEHQ), can be used in such an amount to provide protection from pre-polymerization of the monomer during its synthesis and storage, while not excessively influencing the subsequent polymerization. With respect to the Brominated Monomer of the present invention, a brominated alkylphenol can be reacted with a (meth)acryloyl chloride as shown:

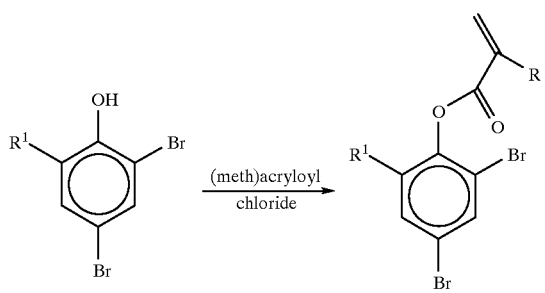

Methyl styrene monomer can be used alone or in combination with one or more comonomer(s), preferably high index of refraction comonomers, to prepare a polymerizable composition that can be processed to form a useful optical product. For purposes of this description, a high index of refraction comonomer can be any polymerizable material (e.g., monomer, oligomer, pre-polymer, copolymers and polymers, etc.), having an index of refraction of at least about 1.50, and being capable in the presence of methyl styrene of being polymerized to produce a useful optical product. As will be apparent in light of the various examples below, the molecular weight of a comonomer can vary greatly.

The amount of methyl styrene monomer present in the polymerizable composition can be any amount that will allow the production of an optical product having desired optical and mechanical properties. For example, while amounts outside of this range can also be useful, it can be preferred to use from about 5 to 40 parts by weight, and more preferably from about 10 to 25 parts by weight methyl styrene monomer, based on 100 parts by weight polymerizable composition.

Comonomers, e.g., high index of refraction comonomer (s), can also be present in the polymerizable composition in any useful amount. For instance, comonomer can be present in an amount in the range from about 60 to 95 parts by weight, more preferably from about 75 to 90 parts by weight based on 100 parts polymerizable composition.

The comonomer can comprise one or a combination of one or more comonomer(s) and/or high index of refraction comonomers. For instance, the comonomer can comprise a mixture of one or more of (meth)acrylate monomers (including mono-, and or multifunctional monomers), and aromatic (meth)acrylate monomer (e.g., a brominated aromatic (meth)acrylate monomer). In a particularly preferred embodiment, the polymerizable composition comprises from about 10 to25 parts by weight methyl styrene monomer, from about 10 to 15 parts by weight nonhalogenated (meth)acrylate monomer, e.g., an aromatic nonhalogenated (meth)acrylate monomer, and from about 65 to 80 parts by weight of one or a combination of aromatic halogenated monomers such as aromatic brominated (meth) acrylate monomers.

The composition of the invention is polymerizable. Polymerization can be accomplished by usual means, such as heating in the presence of a free-radical initiator, irradiation with electromagnetic radiation such as ultraviolet or visible light in the presence of suitable photoinitiators, and by electron beam. For reasons of convenience and production speed, the preferred method of polymerization is by irradiation with ultraviolet or visible light in the presence of photoinitiator. Examples of photoinitiators that are useful in the polymerizable composition include, but are not limited to those commercially available from Ciba Geigy of Tarrytown, N.Y. under the trade designations Darocur 1173, Darocur 4265, Irgacure 651, Irgacure 1800, Irgacure 369, Irgacure 1700, and Irgacure 184 and Irgacure 907. Photoinitiators containing phosphine oxide derivatives are preferred. A preferred photoinitiator is Lucirin® TPO (2,4,6-trimethylbenzoy) diphenyl phosphine oxide commercially available from BASF of Charlotte N.C. The photoinitiator can preferably be present in amounts in the range from 0.1–10 parts by weight per 100 parts by weight of polymerizable composition (pph).

The polymerizable composition can also contain one or more other useful ingredients that, as will be appreciated by those skilled in the polymer art, can be useful in such a polymerizable composition. For example, the radiation curable composition might contain a crosslinking agent, one or more surfactants, pigments, fillers, polymerization inhibitors, and other ingredients that can be useful within a polymerizable composition or optical product. Such ingredients can be included in the composition in amounts known to be effective for their respective purposes.

A crosslinking agent can be useful to increase the glass transition temperature of the polymer resulting from crosslinking the polymerizable composition. Glass transition temperature of a composition can be measured by methods known in the art, such as Differential Scanning Calorimetry (DSC), modulated DSC (MDSC), or Dynamic Mechanical Analysis (DMA). Illustrative examples of suitable crosslinking agents include diallyl phthalate, diallyl terephthalate, 1,3,5-tri-(2-(meth)acryloxyethyl)-s-triazine, and crosslinkers that are commercially available as, e.g., EB 220 (UCB-Radcure of Smyrna Ga.), Ebercryl 3603 (Acrylated epoxy novolac from UCB-Radcure), Ebercryl 693, CN112C60 (Sartomer), Ebercryl 6602 (trifunctional aromatic urethane acrylate). Preferably, the polymeric material will be crosslinked sufficiently to provide a glass transition temperature sufficiently high that the polymeric material is resistant to groove tip deformation. Additionally, it is preferred that during polymerization of the composition, the temperature of the composition is maintained at a temperature that is equal to or slightly below the Tg of the polymerized composition (i.e., equal to or slightly below the midpoint Tg as determined by MDSC). The temperature of the composition during polymerization can be controlled by controlling the temperature of the polymerizable composition, the temperature of the master, or both.

Surfactants such as fluorosurfactants can be included in the polymerizable composition to reduce surface tension, improve wetting, allow smoother coating and fewer defects of the coating, etc. Specific examples of useful surfactants include nonionic fluorosurfactants sold by the 3M Company of St. Paul Minn. under the trade names FC-430, FC-171, and FC-740. Such surfactants can be included in the polymerizable composition, e.g., in an amount in the range from about 0.01 to 0.3 parts by weight per 100 parts polymerizable composition (pph).

Polymeric beads, inorganic fillers, and/or pigments can be added to the polymerizable composition in order to improve processing, to impart slip and scratch resistance to the polymerized material, or to affect optical properties of the polymerized material. Examples of useful polymeric beads include those made of polystyrene, polyacrylates, copolymers of styrene and acrylates, polyethylene, polypropylene, polytetrafluoroethylene, or combinations thereof Examples of inorganic fillers and pigments include solid or hollow glass beads, silica, zirconia, aluminum trihydroxide, and titanium dioxide. The mean particle size can be between 1 and 20 micrometer (um), and the particles can be included in the polymerizable composition in an amount in the range from about 0.25 to 7 weight percent, more preferably from about 0.25 to 2 weight percent.

The present invention describes optical products derived from methyl styrene monomer. The optical product can be any of a variety of known and useful high index of refraction optical products or articles, for example optical lenses, optical films such as high index of refraction films microreplicated films such as totally internal reflecting films, or brightness enhancement films, flat films, multilayer films, retroreflective sheeting, optical light fibers or tubes, and others. The production of optical products from high index of refraction polymerizable materials is described, for example, in U.S. Pat. No. 4,542,449, the disclosure of which is incorporated herein by reference.

The optical product can contain one or more layers, such as flat layers or microreplicated layers, either of which can be derived from methyl styrene monomer. Preferred optical products are those that comprise an optical layer prepared from methyl styrene monomer, e.g., a microstructure-bearing layer. Microstructure-bearing articles can be constructed in a variety of forms, including those having a series of alternating tips and grooves sufficient to produce a totally internal reflecting film (TIRF). An example of such a film is a brightness enhancement film, having regular repeating pattern of symmetrical tips and grooves. Other examples include patterns in which the tips and grooves are not symmetrical and in which the size, orientation, or distance between the tips and grooves is not uniform. Preferred examples of microstructure bearing articles useful as brightness enhancement films are described in Lu et al., U.S. Pat. No. 5,175,030, and Lu, U.S. Pat. No. 5,183,597, said descriptions being incorporated herein by reference.

According to the descriptions of Lu and Lu et al., a microstructure-bearing article can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base and the master, at least one of which is flexible; and (d) curing the composition. The master can be metallic, such as nickel, nickel-plated copper or brass, or can be a thermoplastic material that is stable under the polymerization conditions, and that preferably has a surface energy that allows clean removal of the polymerized material from the master.

A preferred embodiment of an optical product of the invention is illustrated in FIG. 1, illustrating a microstructure-bearing brightness enhancement film. Referring to the Figure, brightness enhancement film 30 comprises base layer 2 and optical layer 4. Optical layer 4 comprises a linear array of regular right prisms, identified as prisms 6, 8, 12, and 14. Each prism, for example, prism 6, has a first facet 10 and a second facet 12. The prisms 6, 8, 12, and 14 are formed on base 2 that has a first surface 18 on which the prisms are formed and a second surface 20 that is substantially flat or planar and opposite first surface 18. By right prisms it is meant that the apex angle $\alpha$ is typically about 90°. However, this angle $\alpha$ can range from 70° to 120° and is preferably from 80° to 100°, and, it is not necessary that the corner be sharp, but it can be either sharp or rounded. The prism facets need not be identical, and the prisms may be tilted with respect to each other. The relationship between the total thickness 24 of the optical article, and the height 22 of the prisms, is not critical. Still, it is desirable to use relatively thinner optical layers with well defined prism facets. A typical ratio of prism height 22 to total thickness 24 is generally between 25/125 and 2/125.

Methyl styrene monomer has been found to increase the adhesive bond strength between a high index of refraction polymer derived from methyl styrene, and a number of substrates (bases or base layers) often used in the production of optical products. The base layer can be of a nature and composition suitable for use in an optical product; i.e., a product designed to control the flow of light. Almost any material can be used as the base material as long as the material is sufficiently optically clear and is of structural strength to be assembled into and used as or within a particular optical product. Preferably, a base material can be chosen to have sufficient resistance to temperature and aging that performance of the optical product is not unduly compromised over time.

The particular chemical composition and thickness of the base material for any optical product can depend on factors such as the requirements of the optical product that is being constructed, e.g., balancing the needs for strength, clarity, temperature resistance, surface energy, ability to adhere to the optical layer or another layer, etc. Useful base materials include cellulose acetate butyrate, cellulose acetate propionate, polyether sulfone, polymethyl methacrylate, polyurethane, polyester, polyvinyl chloride, syndiotactic polystyrene, polyethylene naphthalate (PEN), copolymers or blends based on naphthalene dicarboxylic acids (coPEN), and glass. Optionally, a base may contain mixtures or combinations of these materials; for example the base may be multi-layered, or may contain a dispersed phase suspended or dispersed in a continuous phase.

For some optical products, such as preferred microstructure-bearing brightness enhancement film products, preferred base materials include polyethylene terephthalate (PET) and polycarbonate. Examples of useful polyethylene terephthalate base materials include: photograde polyethylene terephthalate; and MELINEX PET manufactured by ICI Films of Wilmington, Del.

Some preferred base materials can be optically active and can act as polarizing materials. A number of materials (e.g., films) are known in the optical product art to be useful as polarizing materials. Polarization of light through a film can be accomplished, for example, by the inclusion of dichroic polarizers in a film material which selectively absorb passing light; by the inclusion of inorganic materials such as aligned mica chips; a discontinuous phase dispersed in a continuous film, such as droplets of light modulating liquid crystals dispersed within a continuous film; and by preparing a film from microfine layers of different materials. The polarizing material within the film can be aligned into a polarizing orientation, e.g., by methods such as stretching the film, the application of electric or magnetic fields, coating techniques, etc.

Examples of polarizing films include the polarizer films described in Assignee's copending U.S. patent application Attorney Docket Number 52008USA6A and application Ser. No. 08/610,092, and Assignee's copending U.S. patent application Attorney Docket Number 52319USA7A and application Ser. No. 08/610,109, each filed on Feb. 29, 1996 and incorporated herein by reference. The use of these polarizer films in combination with a brightness enhancement film has been described in Applicants' copending U.S. patent application Ser. No. 08/807,262, having Attorney Docket Number 52008USA2C, filed on Feb. 28, 1997, and incorporated herein by reference.

A second example of a polarizing film that can be used as a base are those films described in Applicants' copending U.S. patent application Ser. No. 08/402,041, having Attorney Docket Number 49837USA1C, filed on Mar. 10, 1995, and incorporated herein by reference. One example of such films that are available commercially are those multilayer films sold under the trade designation DBEF (Dual Brightness Enhancement Film), from the 3M Company of St. Paul, Minn. The use of such a multilayer polarizing optical film in a brightness enhancement film has been described in Applicants' copending U.S. patent application Ser. No. 08/402,349, having Attorney Docket Number 49838USA8C, filed on Mar. 10, 1995, and incorporated herein by reference.

This list of base materials is not exclusive, and as will be appreciated by those skilled in the optical products art, other polarizing and non-polarizing films can also be useful as the base for the optical product of the invention. A short list of additional base materials could include those films described in U.S. Pat. Nos. 5,612,820, and 5,486,949.

One or more of the surfaces of the base film can optionally be primed or treated to promote adhesion of the optical layer to the base.

The thickness of a particular base can also depend on the above-described requirements of the optical product. A thickness in the range from about 0.025 millimeters (mm) to 0.5 millimeters can be preferred, with a thickness in the range from about 0.075 millimeters to 0.175 millimeters being especially preferred.

The optical layer typically directly contacts the base layer, and can be of size, shape, and thickness allowing the optical layer to direct or concentrate the flow of light. Thus, the optical layer can be a flat film, or the optical layer can bear a structured or microstructured surface that may be of any of a number of useful patterns, e.g., of a regular or irregular prismatic nature, of an annular prismatic nature, in the form of a cube-corner pattern, or any other lenticular microstructure.

A brightness enhancement film, as is well known, can typically be positioned in a display panel between a diffuser and a display panel lit by a light source, e.g., a backlit liquid crystal display. The brightness enhancement film controls the exit angle of the light emitted from the light source, and increases the brightness of the liquid crystal display panel. The increased brightness enables a sharper image to be produced by the liquid crystal display panel and allows the power of the light source to be reduced to produce a selected brightness. The brightness enhancement film in the backlit flat panel liquid crystal display is useful in equipment such as computers (e.g., laptop computers), televisions (e.g., personal televisions), video recorders, mobile communication devices, and automobile and avionic instrument displays.

The invention will be more fully appreciated with reference to the following non-limiting examples.

EXAMPLES

Measurement of Refractive Index

The refractive index of resin compositions and cured films were measured using an Abbe Refractometer, made by Erma Inc., of Tokyo Japan, and distributed by Fisher Scientific.

Measurement of Viscosity

The viscosity of uncured resin compositions were made using a Brookfield Model LV viscometer set at 30 RPM and using a #3 spindle.

Measurement of Brightness Gain and Viewing Angle

The brightness gain or "gain" is the ratio of photopic brightness of a backlit display (e.g., a liquid crystal display or LCD) with a brightness enhancing film (BEF) compared to the photopic brightness of the display without the BEF (backlight only).

Photopic brightness with BEF
Photopic brightness without BEF

The brightness of a Sharp backlight model C12 P display, powered by a Hewlett Packard E3611A DC power supply was measured with and without BEF using a Minolta Luminance Meter LS-100 Photometer. The BEF was placed on the backlight with the microfine prisms parallel to the long axis of the backlight, and facing the luminance meter. An acrylic frame was place on top of the BEF to keep it flat against the backlight. After waiting for three minutes, the on-axis brightness of the display was measured in units of foot-lamberts. The BEF was then removed and the brightness was measured immediately afterwards. The ratio of these two readings was reported as the gain.

Viewing angle is the angle at which the on-axis brightness has dropped by 50%, in both horizontal and vertical planes. The microprisms of a BEF are usually parallel to the long axis of the display. The horizontal plane is defined as the plane parallel to the microprisms, while vertical plane is perpendicular to the microprisms.

Gain and viewing angles were measured using a typical 10.4" TFT (thin film transistor) display and an EZConstrast Conoscopic Measurement Device, the latter is manufactured by Eldim Company of Caen, France. The device measures brightness over 120 degree cone of light. The unit of brightness is nits (candela per square meter).

The procedure for gain measurement was as follows. The display was warmed up for 30 minutes. Focus was adjusted at the center of display. Record the scan and label as backlight. Place the BEF on display, with microprisms facing the detector and parallel to the long axis of the display. Record the scan and label as BEF. Gain is the ratio of on-axis brightness of the BEF to the on-axis brightness of the backlight.

Viewing angles are measured as follows. Check the scan labeled BEF and select option to highlight locus of data points with brightness value that is one-half of the brightest data (usually very near the center of the scan). Along the horizontal axis read the intersection of the highlight line at both positive and negative directions. The average of the two values is the value of horizontal viewing angle. Read off the vertical viewing angle in similar manner.

Examples 1–2 and Comparative Example 1 Preparation of Polymerizable Compositions Polymerizable compositions were prepared by blending ingredients in the amounts shown in Table 1. The values for the monomers/oligomers are the weight percent (wt %) of the component based on the total weight of the composition. The values for the surfactant, FC430, and initiator, TPO, are parts per hundred parts polymerizable composition.

The general procedure followed in the preparation of these compositions included first charging the RDX51027 with the PEA and BR31, heating at 100° C. until melted, followed by mixing. The methyl styrene was then blended in along with the EB220. The FC430 and TPO were then mixed in for at least 15 minutes. The mixture was then heated in an oven at 60–70° C. for 30 to 60 minutes.

TABLE 1

Compositions

| Example | Methyl Styrene | RDX 51027 | EB220 | BR31 | PEA | FC-430 (pph) | TPO (pph) |
|---|---|---|---|---|---|---|---|
| Comp. Ex. 1 | | 30.0 | 20.0 | 37.5 | 12.5 | 0.3 | 1.0* |
| 1 | 25.0 | 50.0 | 10.0 | 15 | 0 | 0.3 | 2.0** |
| 2 | 11.0 | 55.0 | 5.5 | 22 | 6.5 | 0.3 | 3.0 |

*In Comparative Example 1, 1.0 pph Darocur 1173 was used instead of 3.0 pph TPO.
**In Example 1, 2.0 pph Irgacure 651 was used instead of 3.0 pph TPO Brightness Enhancement Films (BEFs) comprising a microstructured layer disposed on a substrate were prepared by placing the polymerizable composition between a PET substrate and a master with a micro-fine prismatic pattern. The prism angle was 90 degrees, and the prism pitch was 50 um (micrometer) (90/50). The compositions were spread by means of a knife coater to give a coating of 25 um thickness. The combination of PET substrate, polymerizable composition, and the master were heated to the temperature given in Table 2, and passed under a UV lamp (300 watts per square inch). The PET and cured composition were then separated from the tool, with the cured composition having the negative form of the prismatic structure replicated on it. The composite film thus formed is referred to as brightness enhancement film, or BEF.

TABLE 2

Coating Conditions

| Example | Composition Temperature during polymerization | Conveyor Speed (ft/min) |
|---|---|---|
| Comp. Ex. 1 | 54° C. | 25 |
| 1 | 25° C. | 15 |
| 2 | 49° C. | 20 |

The compositions and BEFs were found to have the physical properties outlined in Table 3 below.

TABLE 3

Physical Properties of Compositions and Films

| Example | Refractive Index of Polymerizable Composition | Viscosity (cps @ 23° C.) of Polymerizable Composition | BEF Gain |
|---|---|---|---|
| Comp. Ex. 1 | 1.5592 | solid | 1.572 |
| Ex. 1 | 1.5680 | 500 | 1.592 |
| Ex. 2 | 1.5764 | 2900 | 1.610 |

The data in Table 3 show that the compositions of the invention have a relatively high refractive index, a viscosity at room temperature that is suitable to processing and coating, and are capable of producing BEFs having high levels of gain.

Examples 3 and 4, and Comparative Examples 2 and 3

Comparative Examples 2 and 3, and Examples 3 and 4 were prepared by the same method as described for preparation of Examples 1 and 2, and Comparative Example 1, above.

TABLE 4

Compositions

| Example | Methyl Styrene | RDX 51027 | EB220 | BR31 | PEA | FC-430 (pph) | TPO (pph) |
|---|---|---|---|---|---|---|---|
| Comp. Ex. 1 | | 30.0 | 20.0 | 37.5 | 12.5 | 0.3 | 1.0* |
| Comp. Ex. 2 | | 55.0 | 10.0 | 20.0 | 15.0 | 0.3 | 3.0 |
| Comp. Ex. 3 | | 60.0 | 10.0 | 20.0 | 10.0 | 0.3 | 3.0 |
| Ex. 3 | 15 | 55.0 | 10.0 | 20.0 | | 0.3 | 3.0 |
| Ex. 4 | 20 | 60.0 | 10.0 | 20.0 | | 0.3 | 3.0 |

*In Comparative Example 1, 1.0 pph Darocur 1173 was used instead of 3.0 pph TPO.

To test adhesion of the cured compositions to PET and polycarbonate substrates, the polymerizable compositions were applied between two substrates (PET or polycarbonate) to an uncured thickness of 50 μm. The compositions were polymerized by passing under a UV lamp, as described above. The adhesion of the polymerized compositions to the substrates was measured in grams per inch using the Slip/Peel Tester designed and manufactured by Instrumentors, Inc., of Strongsville Ohio. Specifically, the peel force in g/in was measured using a peel rate of 12 in/minute and a peel angle of 170°. These results along with the results as determined from Comparative Example 1 are shown in Table 5 below.

TABLE 5

Adhesion To Substrates

| | Ave. Peel Force (g/in) | |
|---|---|---|
| Composition | PET | Polycarbonate |
| Comparative Ex. 1 | 40 | 1 |
| Comparative Ex. 2 | 40 | 5 |
| Comparative Ex. 3 | 45 | 2 |
| Example 3 | 190+ | 150 |
| Example 4 | 190+ | 175 |

Example 5

Polymerized compositions of this invention have good adhesion to a variety of film substrates. The composition of Example 5 was prepared according to the method used to prepare the above Examples with the ingredients of Table 6, except that the process temperatures of Table 7 were used.

TABLE 6

| | | | Composition | | | | |
|---|---|---|---|---|---|---|---|
| Example | Methyl Styrene | BR-31 | RDX-51027 | EB220 | PEA | FC-430 PPH | Darocur 4265 |
| 5 | 12.5 | 25 | 52.5 | 5.5 | 4.5 | 0.3 | 2.0 |

TABLE 7

| | Coating Conditions for Composition | | |
|---|---|---|---|
| Example | Substrate | Composition Temperature during polymerization | Conveyor Speed (ft/min) |
| 5A | Polycarbonate | 54° C. | 25 |
| 5B | DBEF/CoPEN Skin | 85° C. | 25 |
| 5C | DBEF/PET skin | 85° C. | 25 |
| 5D | Substrate A | 54° C. | 30 |

BEF-type films were prepared in the same manner as described in the above Examples 1 and 2 using four different film substrates; these BEFs are identified as 5A, 5B, 5C, and 5D in Tables 7 and 8. The polymeric composition showed good adhesion to each of these substrates whereas the polymeric composition of Comparative Example 1 does not adhere to any of these substrates. The substrates, as identified in Tables 7 and 8, include Polycarbonate, DBEF/CoPEN skin (3M DBEF having a layer of CoPEN on each side), DBEF/PET skin (3M DBEF having a layer of PET on each side), and Substrate A.

Substrate A was a three layer optical film prepared in accordance with U.S. patent application Ser. No. 08/610,109, having Attorney Docket Number 52319USA7A using conventional three layer coextrusion techniques. The film had a core layer and a skin layer on each side of the core layer. The core layer consisted of a blend of 73.5% 70.30.0 coPEN whose intrinsic viscosity was 0.55 measured in 60% phenol/40% dichlorobenzene, 24.5% sPS 200-7 (available from Dow Chemical Company), and 2% Dylark 332-80 (available from NOVA Chemical). Each skin consisted of 80/20 (w/w) PET/PEI (polyethylene isophthalate). The designation of x.y.z. coPEN was a copolymer based on x mole % naphthalene dicarboxylate, y mole % dimethyl terephthalate, and z mole % dimethyl isophthalate. The designation sPS 200-7 refers to a copolymer of syndiotactic-polystyrene whose molecular weight was approximately 200,000 Daltons where the 7 mole % comonomer was paramethylstyrene.

The resulting three layer cast film had a core layer thickness of about 430 microns, and each skin layer was about 102 microns thick for a total thickness of about 635 microns.

The cast film was oriented in the width or transverse direction (TD) on a polyester film tentering device. The stretching was accomplished at about 5.8 meters per minute (19 feet per minute) with an output width of 135 cm (53 inches) and had a stretch temperature of 129° C. (265° F.), the heat set temperature was 141° C. (285° F.).

TABLE 8

| | Brightness Gain | | |
|---|---|---|---|
| Example | Thermoplastic Film | Gain of Substrate | Gain of BEF |
| 5A | Polycarbonate (pc) | none | 1.62 |
| 5B | DBEF, CoPEN skin | 1.63 | 2.10 |
| 5C | DBEF, pc/PET skin | 1.20 | 2.08 |
| 5D | Substrate A | 1.30 | 1.52 |

No brightness gain could be measured for Comparative Examples 1, 2, or 3 because these compositions failed to adhere to any of the substrates.

Viewing Angle

Viewing angles of conventional BEFs were compared to the viewing angles of a BEF of the present invention. The conventional BEF refers to two 90° crossed BEFs prepared according to Comparative Example 1.

TABLE 9

| | Half Brightness Viewing Angle | |
|---|---|---|
| Film | Horizontal | Vertical |
| Conventional BEF | 24 degrees | 22.5 degrees |
| DBEF 5B | 47 degrees | 32.5 degrees |

The data of Table 9 shows that unlike the narrow viewing angle associated with two crossed sheets of a conventional BEF, the single sheet DBEF with microfine prismatic pattern has a wide view angle as can be seen from the table below.

What is claimed is:

1. A polymerizable composition comprising methyl styrene monomer of the general formula:

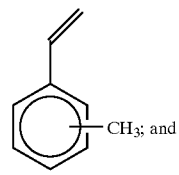

one or more comonomers comprising at least one high index of refraction comonomer.

2. The composition of claim 1, wherein the high index of refraction comonomer has an index of refraction of at least 1.50.

3. The composition of claim 1, wherein the comonomers comprise an unsaturated aromatic comonomer.

4. The composition of claim 1, wherein the comonomers comprise a (meth)acrylate monomer.

5. The composition of claim 1, wherein the comonomers comprise a brominated comonomer.

6. The composition of claim 1, wherein the comonomers comprise a brominated (meth)acrylate comonomer.

7. The composition of claim 1, wherein the comonomers comprise an alkyl-substituted brominated aromatic ester (meth)acrylate monomer.

8. The composition of claim 7, wherein the brominated aromatic (meth)acrylate comonomer comprises monomer of the general formula:

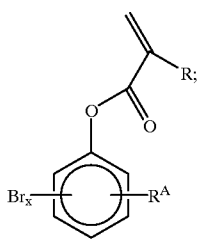

wherein R can be hydrogen or methyl, $R^A$ can be a straight or branched alkyl, and x can be in the range from about 1 to 4.

9. The composition of claim 1, wherein the polymerizable composition comprises from about 5 to 15 parts by weight methyl styrene monomer, based on 100 parts polymerizable composition.

10. The composition of claim 1, comprising:
from 5 to 40 parts by weight methyl styrene monomer; and
from 60 to 95 parts by weight comonomer.

11. The composition of claim 1, comprising:
from 5 to 25 parts by weight methyl styrene monomer;
from 10 to 15 parts by weight non-halogenated (meth)acrylate monomer; and
from 65 to 80 parts by weight brominated aromatic (meth)acrylate monomer.

12. A polymerizable composition comprising methyl styrene monomer of the general formula:

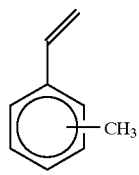

wherein the polymerizable composition has an index of refraction of at least 1.55.

13. The polymerizable composition of claim 12, wherein the index of refraction is at least 1.56.

14. An optical product comprising a polymeric material comprising monomeric units derived from methyl styrene monomer of the general formula:

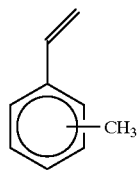

15. The optical product of claim 14, wherein the polymeric material comprises monomeric units further derived from a high index of refraction comonomer.

16. The optical product of claim 15, wherein the high index of refraction monomer has an index of refraction of at least 1.50.

17. The optical product of claim 15, wherein the comonomer comprises an unsaturated aromatic comonomer.

18. The optical product of claim 15, wherein the comonomer comprises a (meth)acrylate monomer.

19. The optical product of claim 15, wherein the comonomer comprises a brominated comonomer.

20. The optical product of claim 15, wherein the comonomer comprises a brominated (meth)acrylate comonomer.

21. The optical product of claim 15, wherein the comonomers comprise an alkyl-substituted brominated aromatic ester (meth)acrylate monomer.

22. The optical product of claim 21, wherein the brominated aromatic (meth)acrylate comonomer comprises monomer of the general formula:

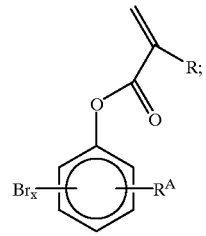

wherein R can be hydrogen or methyl, $R^A$ can be a straight or branched alkyl, and x can be in the range from about 1 to 4.

23. The optical product of claim 15, wherein the polymerizable composition comprises from about 5 to 15 parts by weight methyl styrene monomer, based on 100 parts polymerizable composition.

24. The optical product of claim 14, comprising:
from 5 to 40 parts by weight methyl styrene monomer; and
from 60 to 95 parts by weight comonomer.

25. The optical product of claim 14, comprising:
from 5 to 25 parts by weight methyl styrene monomer;
from 10 to 15 parts by weight non-halogenated (meth)acrylate monomer; and
from 65 to 80 parts by weight brominated aromatic (meth)acrylate monomer.

26. The optical product of claim 14, comprising a film derived from the methyl styrene monomer.

27. The optical product of claim 14, comprising
a base; and
an optical layer prepared from a polymerizable composition, the polymerizable composition comprising methyl styrene monomer.

28. The optical product of claim 27, wherein the base is prepared from materials selected from the group consisting of: cellulose acetate butyrate, cellulose acetate propionate, polyether sulfone, polymethyl methacrylate, polyurethane, polyester, polyvinyl chloride, syndiotactic polystyrene, polyethlene naphthalate, copolymers or blends based on naphthalene dicarboxylic acids, and glass.

29. The optical product of claim 28, wherein the base comprises a polarizer.

30. The optical product of claim 14, comprising a brightness enhancement film derived from the methyl styrene monomer.

31. A backlit flat panel display comprising the brightness enhancement film of claim 30.

32. A computer or television comprising the backlit flat panel display of claim 31.

33. A microstructure-bearing article comprising an optical layer derived from a polymerizable composition comprising methyl styrene monomer.

* * * * *